UNITED STATES PATENT OFFICE.

MARY PIKE, OF CORNISH, NEW HAMPSHIRE.

IMPROVED EYE-WATER.

Specification forming part of Letters Patent No. 46,494, dated February 21, 1865.

*To all whom it may concern:*

Be it known that I, Mrs. MARY PIKE, of Cornish, in the county of Sullivan and State of New Hampshire, have invented a new and Improved Eye-Water for Sore or Inflamed Eyes; and I do hereby declare that the following is a full, clear, and exact description of the same.

This invention consists in a mixture of sulphate of zinc (white vitriol) and chloride of sodium (rock-salt) dissolved in water.

I take of the sulphate of zinc one-half ounce, chloride of sodium one table-spoonful. These substances are dissolved in one quart of water, and a little wintergreen or other essence may be added merely to give it a pleasant perfume. The sulphate of zinc has astringent qualities which allay inflammation, and the chloride of sodium has a soothing tendency.

I claim as new and desire to secure by Letters Patent—

An eye water or lotion composed of the sulphate of zinc and chloride of sodium mixed together and dissolved in water, about in the proportions herein set forth.

MARY PIKE.

Witnesses:
JOHN B. PIKE,
HENRY A. DICKINSON.